United States Patent
Allen et al.

(10) Patent No.: US 8,953,732 B2
(45) Date of Patent: Feb. 10, 2015

(54) NUCLEAR REACTOR INTERNAL HYDRAULIC CONTROL ROD DRIVE MECHANISM ASSEMBLY

(75) Inventors: Bruce F. Allen, Granby, CT (US); Gregory E. Falvo, Suffield, CT (US); Alexander W. Harkness, Gibsonia, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 445 days.

(21) Appl. No.: 13/314,506

(22) Filed: Dec. 8, 2011

(65) Prior Publication Data

US 2012/0148008 A1    Jun. 14, 2012

Related U.S. Application Data

(60) Provisional application No. 61/421,247, filed on Dec. 9, 2010.

(51) Int. Cl.
  *G21C 7/06* (2006.01)
  *G21C 7/16* (2006.01)
  *H02K 33/00* (2006.01)
(52) U.S. Cl.
  CPC *G21C 7/16* (2013.01); *H02K 33/00* (2013.01); *Y02E 30/39* (2013.01)
  USPC .......................................... 376/233; 376/231
(58) Field of Classification Search
  USPC ................................................ 376/231, 233
  See application file for complete search history.

(56) References Cited

U.S. PATENT DOCUMENTS

| | | | | |
|---|---|---|---|---|
| 3,841,202 A | * | 10/1974 | Groves | 91/471 |
| 3,855,059 A | * | 12/1974 | Groves et al. | 376/230 |
| 3,941,653 A | * | 3/1976 | Thorp, II | 376/235 |
| 4,076,584 A | | 2/1978 | Golden et al. | |
| 4,222,822 A | * | 9/1980 | Mueller et al. | 376/217 |
| 4,643,868 A | * | 2/1987 | Bollinger | 376/262 |
| 4,752,433 A | | 6/1988 | Altman et al. | |
| 4,978,494 A | | 12/1990 | Rinker | |
| 5,009,834 A | * | 4/1991 | Tessaro | 376/232 |
| 5,053,190 A | * | 10/1991 | Gardner et al. | 376/366 |
| 5,066,451 A | | 11/1991 | Tessaro | |
| 5,361,279 A | * | 11/1994 | Kobsa et al. | 376/230 |
| 5,445,034 A | * | 8/1995 | Peter et al. | 73/861.75 |
| 2007/0030941 A1 | * | 2/2007 | Wintermann | 376/230 |

FOREIGN PATENT DOCUMENTS

DE         3435534 A  *  4/1986

* cited by examiner

*Primary Examiner* — Timothy A Brainard
(74) *Attorney, Agent, or Firm* — Richard J. Coldren; Westinghouse Electric Company LLC

(57) ABSTRACT

A control rod drive system for a nuclear reactor that employs hydraulic cylinders to operate a conventional plunger/gripper drive system to incrementally move control rods into and out of the core of a reactor. The pressure differential for driving hydraulic pistons within the cylinders is obtained from the difference in pressure between the outside and inside of the core barrel of the reactor and control of the pistons is obtained from external solenoids attached to the reactor control system. The external solenoids regulate a charging pump feed to Poppet valves that control the hydraulic feed to the cylinders. A hydraulic piston/cylinder drive is also provided for the shutdown rods which operate in either an all in or out of the core condition.

13 Claims, 9 Drawing Sheets

NUCLEAR REACTOR INTERNAL HYDRAULIC CONTROL ROD DRIVE MECHANISM ASSEMBLY

CROSS REFERENCE TO RELATED APPLICATION

This application claims priority under 35 U.S.C. §119(e) to U.S. Provisional Patent Application Ser. No. 61/421,247, filed Dec. 9, 2010 entitled, INTERNAL HYDRAULIC CRDM ASSEMBLY.

BACKGROUND

1. Field

This invention relates in general to nuclear reactor control systems, and, in particular to systems for controlling the movement of nuclear control rods into and out of the core of the nuclear reactor.

2. Description of Related Art

In a nuclear reactor for power generation, such as a pressurized water reactor, heat is generated by fission of a nuclear fuel such enriched uranium, and transferred into a coolant flowing through a reactor core. The core contains elongated nuclear fuel rods mounted in proximity with one another in a fuel assembly structure, through and over which the coolant flows. The fuel rods are spaced from one another in co-extensive parallel arrays. Some of the neutrons and other atomic particles released during nuclear decay of the fuel atoms in a given fuel rod pass through the spaces between fuel rods and impinge on the fissile material in adjacent fuel rods, contributing to the nuclear reaction and to the heat generated by the core.

Moveable control rods are dispersed throughout the nuclear core to enable control of the overall rate of the fission reaction, by absorbing a portion of the neutrons passing between fuel rods, which otherwise would contribute to the fission reaction. The control rods generally comprise elongated rods of neutron absorbing material and fit into longitudinal openings or guide thimbles in the fuel assemblies running parallel to and between the fuel rods. Inserting a control rod further into the core causes more neutrons to be absorbed without contributing to fission in an adjacent fuel rod; and retracting the control rod reduces the extent of neutron absorption and increases the rate of the nuclear reaction and the power output of the core.

The control rods are supported in cluster assemblies that are moveable to advance or retract a group of control rods relative to the core. For this purpose, control rod drive mechanisms are provided, typically as part of an upper internal arrangement located, at least in part, within the reactor vessel above the nuclear core. The reactor vessel of a pressurized water reactor is typically pressurized to a high internal pressure, and the control rod drive mechanisms are housed in pressure housings that are tubular extensions of the reactor pressure vessel. FIG. 1 is a schematic view of a prior art nuclear containment 10 housing a nuclear reactor pressure vessel 12 of a typical pressurized water reactor having a nuclear core 14 supported within the lower half of the pressure vessel 12. A control rod assembly 16, i.e., one of the cluster assemblies, is figuratively shown within the core 14 and supports a cluster of control rods 18 that are moved into and out of the fuel assemblies (not shown) by a drive rod 20. The drive rod 20 is moveably supported by a drive rod housing 24 that extends upwardly and through a removable reactor closure head 22. Control rod drive mechanisms (CRDM) are positioned above the reactor head around the control rod drive housing 24 and move the drive rods in a vertical direction to either insert or withdraw the control rods 18 from the fuel assemblies within the core 14. Rod position indicator coils 26 or other indicator mechanisms are positioned around the housing 24 to track the position of the drive rod 20, and thus the control rods 18 relative to the core 14. The output of the position indicator coils 26 is fed through a processor rod position indicator (RPI) electronics cabinet 28 within the containment 10. The output of the rod position indicator electronics cabinet 28 is then fed outside the containment to a logic cabinet 30 and an RPI processing unit 32. The logic cabinet 30 interfaces with the control system 34 which provides manual instructions from a user interface 36 as well as automatic instructions which are generated from intelligence obtained from plant sensors not shown. The logic cabinet 30 receives the manual demand signals from an operator through the user interface 36 and a reactor control system 34 or automatic demand signals from the reactor control system 34 and provides the command signals needed to operate the control rods 18 according to a predetermined schedule. The power cabinet 38 provides a programmed current to operate the CRDM, all in a well known manner.

One type of mechanism for positioning a control rod assembly 16 is a magnetic jack type mechanism, operable to move the control rod drive rod by an incremental distance, of approximately ⅝ inch (1.63 cm), into or out of the core in discrete steps. In one embodiment, the control rod drive mechanism has three electromagnetic coils and armatures or plungers actuated by the electromagnetic coils, that are operated in a coordinated manner to raise and lower the drive rod shaft 20 and a control rod cluster assembly 16 coupled to the shaft 20. The three coils (CRDM) are mounted around and outside the pressure housing 24. Two of the three coils operate grippers that when powered by the coils engage the drive rod shaft, with one of the grippers being axially stationary and the other axially moveable under the influence of the third coil.

The drive rod shaft has axially spaced circumferential grooves that are clasped by latches on the grippers, spaced circumferentially around the drive shaft. The third coil actuates a lift plunger coupled between the moveable grippers and a fixed point. If the power to the control rod mechanism is lost, the two grippers both release and the control rods drop by gravity into their maximum nuclear flux damping position. So long as control rod power remains activated, at least one of the stationary grippers and the moveable grippers hold the drive rod shaft at all times.

The three coils are operated in a timed and coordinated manner alternately to hold and to move the drive shaft. The sequence of gripping actions and movement is different depending on whether the stepwise movement is a retraction or an advance. The stationary grippers and the moveable grippers operate substantially alternately, although during the sequence of movements both types of grippers engage the drive shaft during a change from holding stationary to movement for an advance or retraction. The stationary gripper can hold the drive shaft while the movable gripper is moved to a new position of engagement for lowering (advancing) the drive shaft and the control rods. The moveable grippers engage the drive shaft when moving it up or down as controlled by the lift plunger. After the moveable gripper engages the drive shaft, the stationary gripper is released and then the plunger is activated or deactivated to effect movement in one direction or the other. Typically, each jacking or stepping movement moves the drive rod shaft ⅝ inch (1.6 cm), and some 228 steps are taken at about 0.8 seconds per step to move a control rod cluster over its full span of positions between the bottom and the top of a typical fuel assembly, though the number of steps will vary with the height of the fuel assembly.

A number of particular coil arrangements and gripper designs are possible. Examples of coil jacking mechanisms with a stationary gripper, a moveable gripper and a lifting coil, as described heretofore, are described, for example, in U.S. Pat. Nos. 5,307,384, 5,066,451 and 5,009,834. In addition, four and five-coil linear drive mechanisms have been employed that operate in a similar manner, such as that described in U.S. Pat. No. 3,959,071.

Whatever mechanical arrangement is employed for the grippers and lifting coils/armatures arrangement, the lifting coils are housed outside the pressure boundary of the reactor vessel where they can be cooled, usually by forced ventilation and are magnetically coupled to the latch assemblies through the pressure housings that surround the drive rods. However, at least one of the next generation nuclear reactors under development is a small modular reactor that has the core, upper internals, steam generator, pressurizer and inlets and outlets of the primary loop circulation pumps housed within the same pressure vessel. In such an arrangement, the entire control rod drive mechanism is immersed within the reactor coolant, in which the conventional arrangement of coils could not operate reliably. Even if the coils were housed to protect them from direct contact with the coolant, conventional coils could not withstand the temperatures they would experience in an operating cycle.

FIGS. 2 and 3 illustrate such a small modular reactor. FIG. 2 shows a perspective view, partially cut away, to show the pressure vessel and its internals. FIG. 3 is an enlarged view of the pressure vessel shown in FIG. 2. The pressurizer 54 is integrated into the upper portion of the reactor vessel head and eliminates the need for a separate component. A hot leg riser 56 directs primary coolant from the core 14 to a steam generator 58 which surrounds the hot leg riser 56. Six reactor coolant pumps 60 are circumferentially spaced around the reactor vessel at an elevation near the upper end of the upper internals 62. The reactor coolant pumps are horizontally mounted axial-flow canned motor pumps. The reactor core 14 and the upper internals 62, except for their size, are substantially the same as the corresponding components in an AP1000® reactor. From the foregoing, it should be apparent that a traditional magnetic jack control rod drive system would not function reliably in the reactor design illustrated in FIGS. 2 and 3, because the coils would be fully immersed in the coolant, and even if shielded from the coolant with an outer housing, would not readily receive sufficient cooling to prevent failures of the magnetic coils.

Accordingly, a new control rod drive mechanism is desired that will function with proven reliability while immersed in a reactor coolant.

Furthermore, such a design is desired that will satisfy regulatory requirements with minimal testing.

SUMMARY

These and other objects are achieved by a nuclear reactor power generating system having a reactor vessel including a lower section and removable upper head having a horizontal span closing off the lower section and forming a pressure vessel. A reactor core is housed in the lower section and comprises a plurality of fuel assemblies. A control rod assembly is provided, including at least one control rod that is driven into or out of a corresponding one of the plurality of fuel assemblies. A drive rod is connected to the control rod for driving the control rod into and out of the corresponding fuel assembly. A drive mechanism actuates the drive rod to move along a linear path as it drives the control rod into and out of the corresponding fuel assembly. The drive mechanism comprises at least one hydraulic piston. Preferably, the drive mechanism comprises the moveable components of a contemporary jack assembly of a magnetic jack drive mechanism having a stationary gripper coil, a moveable gripper coil and a lift coil, each magnetically coupled to a respective plunger which moves one of either a stationary gripper or moveable gripper and wherein the stationary gripper coil is replaced by a first hydraulic piston which is mechanically coupled to the stationary gripper; the moveable gripper coil is replaced by a second hydraulic piston which is mechanically coupled to the moveable gripper and the lift coil is replaced with a third hydraulic piston which is mechanically coupled to the moveable gripper, with the first, second and third hydraulic pistons controlled to actuate the corresponding gripper that they are coupled with to sequentially move the grippers in a traditional manner. Preferably, the first, second and third hydraulic pistons are substantially of the same design and desirably, the first, second and third hydraulic pistons are controlled sequentially by poppet pistons under the direction of the reactor control system.

Preferably, except for at least some of the hydraulic feed, the drive mechanism is wholly contained within the reactor vessel. The hydraulic feed for the drive mechanism is at least in part obtained from the reactor coolant that was on a path to traverse the reactor core. In one embodiment, the pressure differential that drives the hydraulic piston of the drive mechanism is taken from the pressure differential across the core and, preferably, from either side of a core barrel which surrounds the core, between the core and the reactor vessel.

In one embodiment, the drive mechanism includes a hydraulic valve for driving the hydraulic piston, wherein the hydraulic valve includes an input from a main charging pump that pumps coolant into the reactor vessel.

In another embodiment, the control rod is a shutdown rod moveable, substantially in a single step, into or out of the reactor. In still another embodiment, the drive mechanism moves the control rod in discrete increments into and out of the core wherein the discrete increments are greater than ⅝ inch (1.63 cm) and less than or equal to two inches (5.08 cm). Preferably, the discrete increments are greater than ⅝ inch (1.63 cm) and less than or equal to one inch (2.54 cm).

Desirably, the hydraulic piston has a vent that is vented directly into the coolant exiting the reactor core. Preferably, the drive mechanism has a lift capacity of greater than 360 pounds (163.29 Kg) and less than or equal to 1,000 pounds (453.59 Kg).

BRIEF DESCRIPTION OF THE DRAWINGS

A further understanding of the invention claimed hereafter can be gained from the following description of the preferred embodiments when read in conjunction with the accompanying drawings in which:

DESCRIPTION OF THE PREFERRED EMBODIMENT

Figure 1:
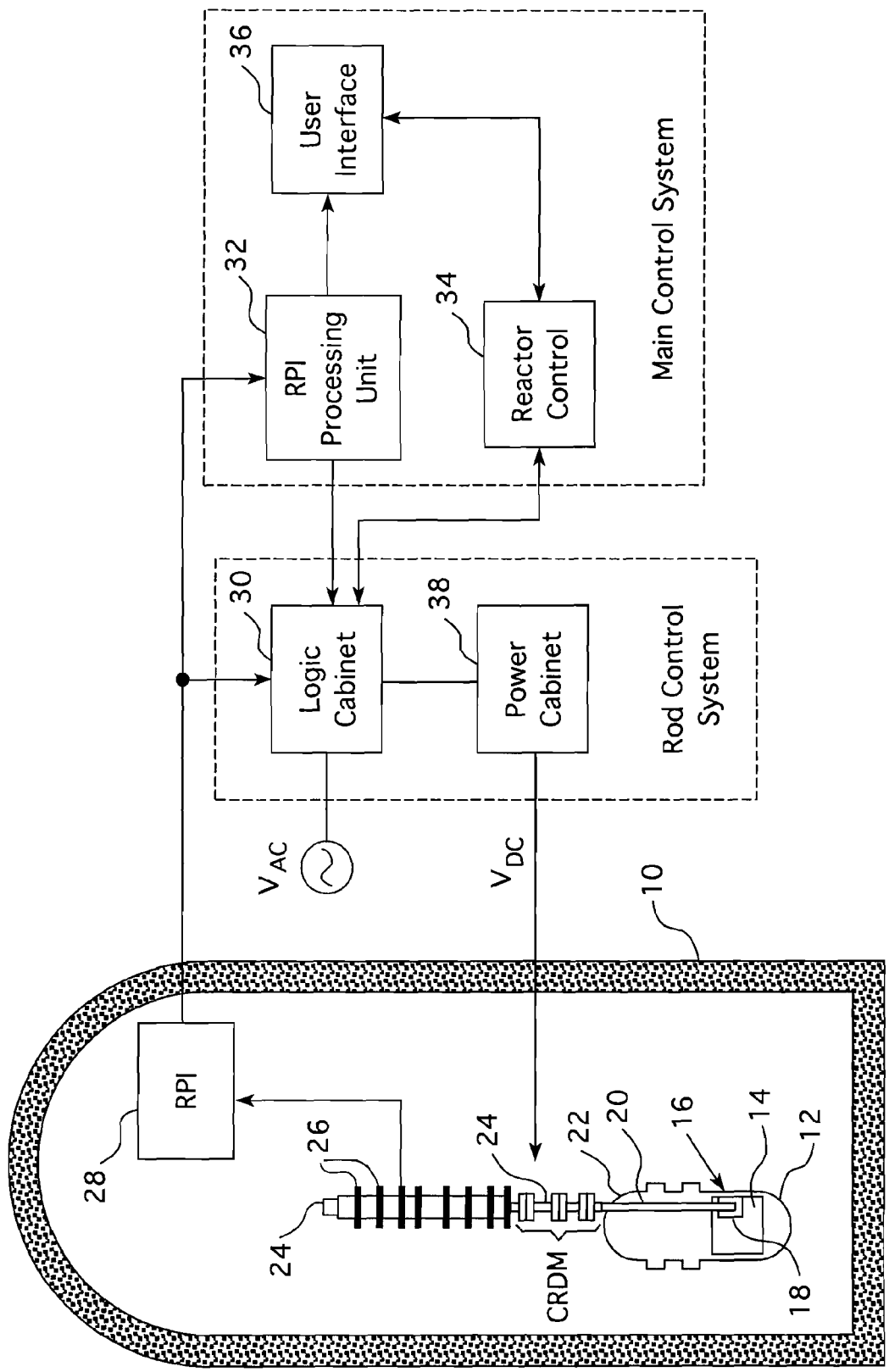
FIG. 1 is a schematic view of a traditional pressurized water reactor nuclear containment showing an outline of a nuclear reactor vessel supporting a control rod drive system for inserting and withdrawing a control rod assembly into and out of the core of the reactor vessel.

As stated in regard to FIG. 1, the control rods are attached in clusters 16, commonly referred to as spider assemblies, with each cluster being commonly driven by a drive rod 20 disposed in a vertical support housing 24 above the reactor core 14 containing the fuel assemblies into which the control rods 18 are advanced or from which the control rods are retracted for variable damping of nuclear flux within the reactor core. The moving parts of the control rod drive mechanism are within the pressure envelope of the reactor and in the conventional designs, the electromagnetic coils (CRDM) for driving the moveable parts are disposed around and about each of the housings 24 that extends above the reactor. In viewing the several figures, it should be appreciated that like reference characters refer to corresponding parts.

Figure 4:
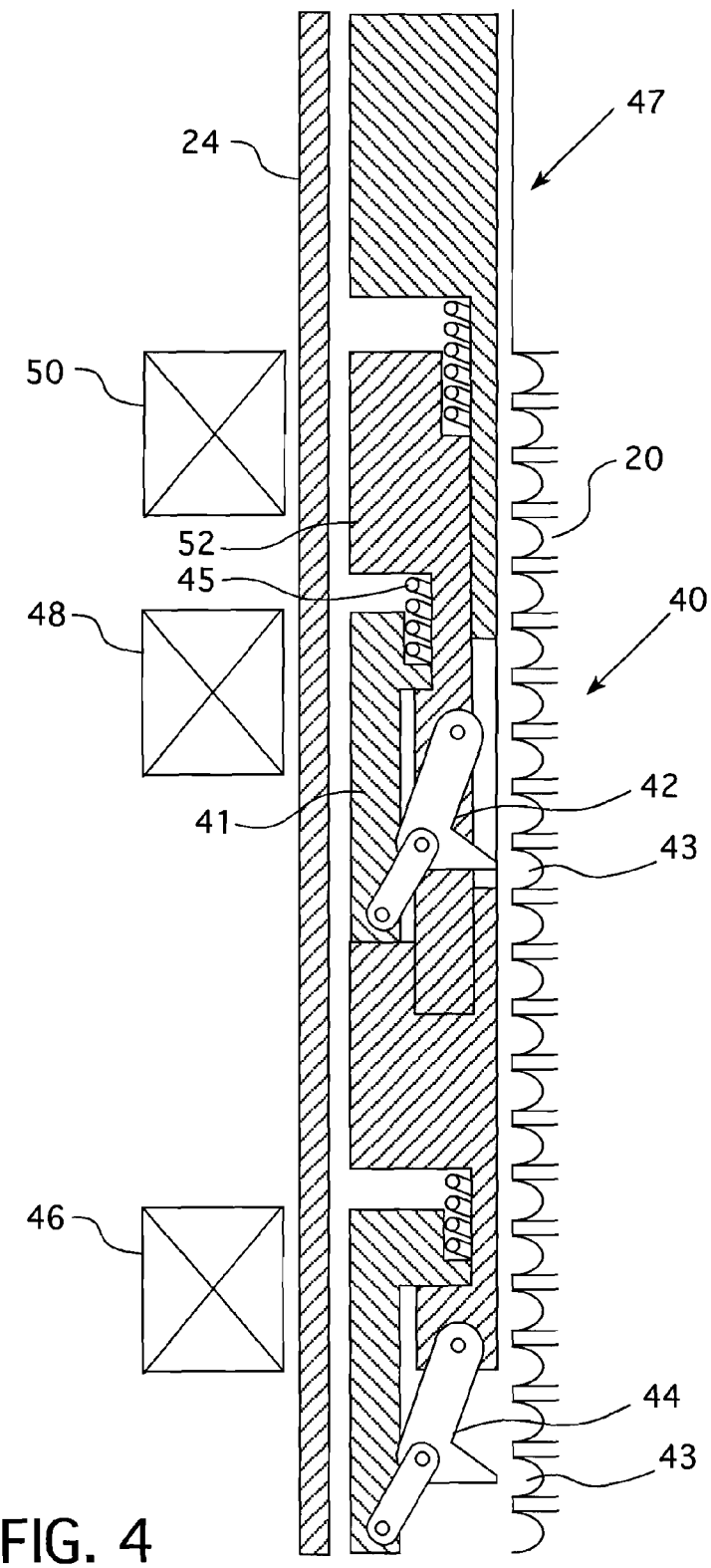
FIG. 4 is an enlarged schematic view of the control rod drive shaft drive system shown in FIG. 1 with a portion cut away to show the internal elements of the drive system.

FIG. 4 shows a drive rod drive mechanism 40 with the extended portion of the housing 24 of a traditional reactor partly cut away to show the grippers 42 and 44 that are operable in sequences to engage, lift and/or lower the drive rod 20 when the associated coils 46, 48 and 50 of the drive mechanism 40 are energized in a prescribed sequence. This arrangement is substantially as disclosed in U.S. Pat. No. 5,009,834.

The rod control system is a system that functions in conjunction with the nuclear plant instrumentation and control systems 34, as shown in FIG. 1, to insert or withdraw the control rods from the reactor core. A nuclear plant, commonly contains a number of control rod assemblies that are arranged in groups; typically, four control rod assemblies per group. Groups of control rod assemblies are usually inserted/withdrawn together to regulate the reactor temperature and power. The instrumentation and control system 34 monitors reactor temperature and power and provides signals to the rod control system to demand rod motion as appropriate. In response to these demand signals, the rod control system inserts/withdraws the control rods. Control rod motion is accomplished by cycling the electric power on/off to the various coils 46, 48 and 50 in the control rod drive mechanism 40 (shown in FIG. 4).

As previously mentioned, the control rod drive mechanism employed in many of the commercial pressurized water reactors currently in operation is a magnetic jack mechanism that can move the drive rod of a control rod assembly 16 in fixed increments each time power to the coils is cycled. A spider of control rods 18 is attached to the bottom of the control rod drive rod 20 (sometimes referred to as the drive shaft) so that all the control rods within an assembly move together. The control rod drive mechanism 40 shown in FIG. 4 contains three coils; a stationary gripper coil 46, a moveable gripper coil 48 and a lift coil 50. As mentioned in the previous paragraph, by cycling electric power to these coils on and off in different sequences, a conventional control rod mechanism 40 can cause the control rod drive shaft 20 and the control rods 16 to insert or withdraw from the nuclear core. More particularly, for lifting (retracting) the control rods, the following steps are accomplished in sequence, beginning with the stationary gripper 44 engaged in a drive rod groove 43 and the moveable gripper 42 and plunger 41 both being deactivated, (the plunger 41 extended in the direction biased by the spring 45. The sequence for lifting the drive rod 20 is:

1) the moveable gripper coil is energized which cause the moveable gripper 42 to engage an adjacent drive rod groove 43;

2) the stationary gripper 46 is de-energized and disengages the stationary gripper from the drive rod 20;

3) the lift coil 50 is energized and magnetically lifts the moveable gripper 44 and the drive rod 20 an elevation equal to the span of movement of the lift plunger 52;

4) the stationary gripper coil 46 is then energized which moves the stationary gripper into contact with the adjacent drive rod groove to hold the drive rod at the new elevation, i.e., both grippers are engaged;

5) the moveable gripper coil 48 is then de-energized and disengages the moveable gripper 42 from the drive rod groove; and 6) the lift coil 50 is de-energized, which drops the moveable gripper 42 back to its start position, only one step lower on the lifted drive rod 20.

Similarly, for lowering (advancing) the control rods, the following steps are accomplished in sequence, again beginning with only the stationary gripper coil 46 energized. The lower sequence is:

1) the lift coil 50 is energized, moving the moveable gripper 42 one step up along the drive rod 20;

2) the moveable gripper coil 48 is energized and the moveable gripper 42 grips the drive rod 20;

3) the stationary coil 46 is de-energized releasing the stationary gripper 44 from the drive rod;

4) the lift coil 50 is de-energized, dropping the moveable gripper 42 and the drive rod one step;

5) the stationary coil 46 is energized and the stationary gripper 44 engages the drive rod 20, at a position one step higher than its previous position; and 6) the moveable gripper coil 48 is de-energized and the moveable gripper 42 disengages from the drive rod 20.

As previously mentioned, a number of different arrangements of coil and gripper mechanisms are possible and should not detract from the breath of the invention claimed hereafter. Whatever mechanical configuration is employed for the grippers and lifting coils/armature arrangement, the coils have to operate effectively to produce a sufficient magnetic field so that the grippers can exert the designed force required to prevent the control rod drive rods from dropping into the core, which would necessitate an expensive shutdown of the reactor system.

Figure 2:
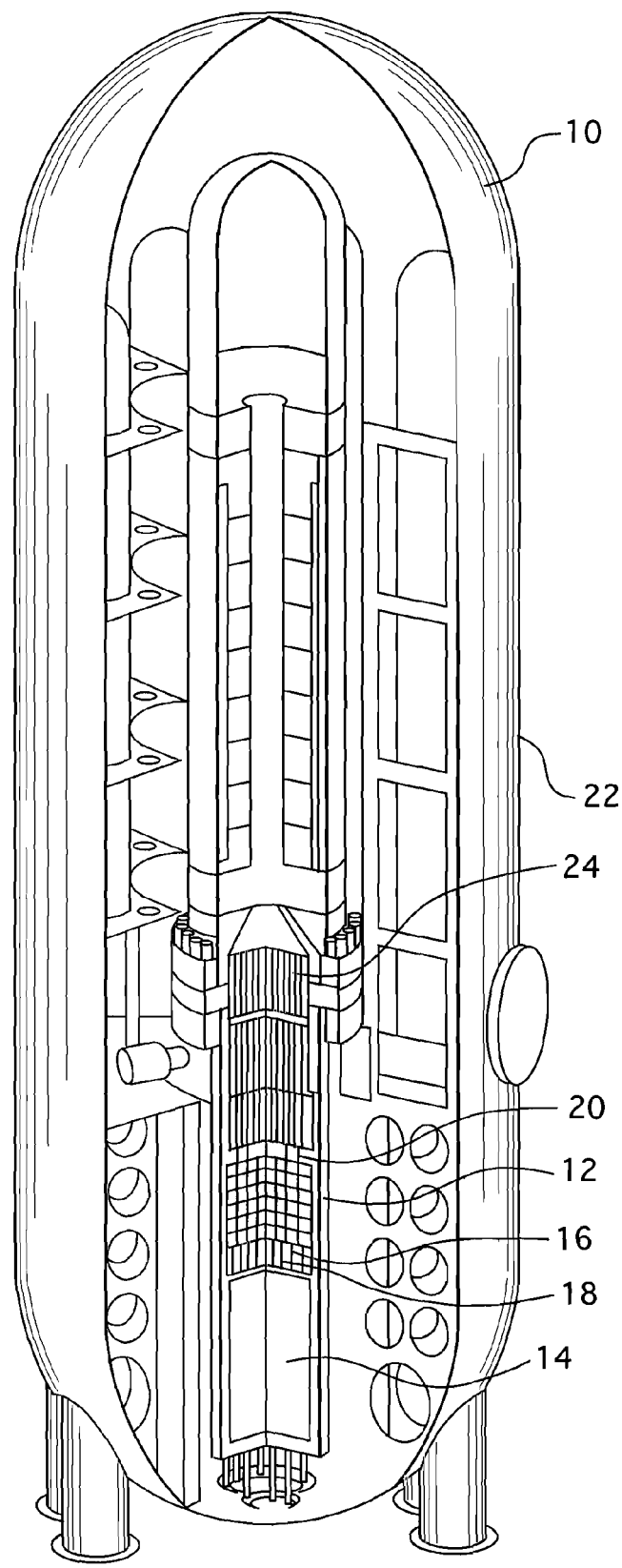
FIG. 2 is a perspective view, partially cut away, showing a small modular reactor system.
Figure 3:
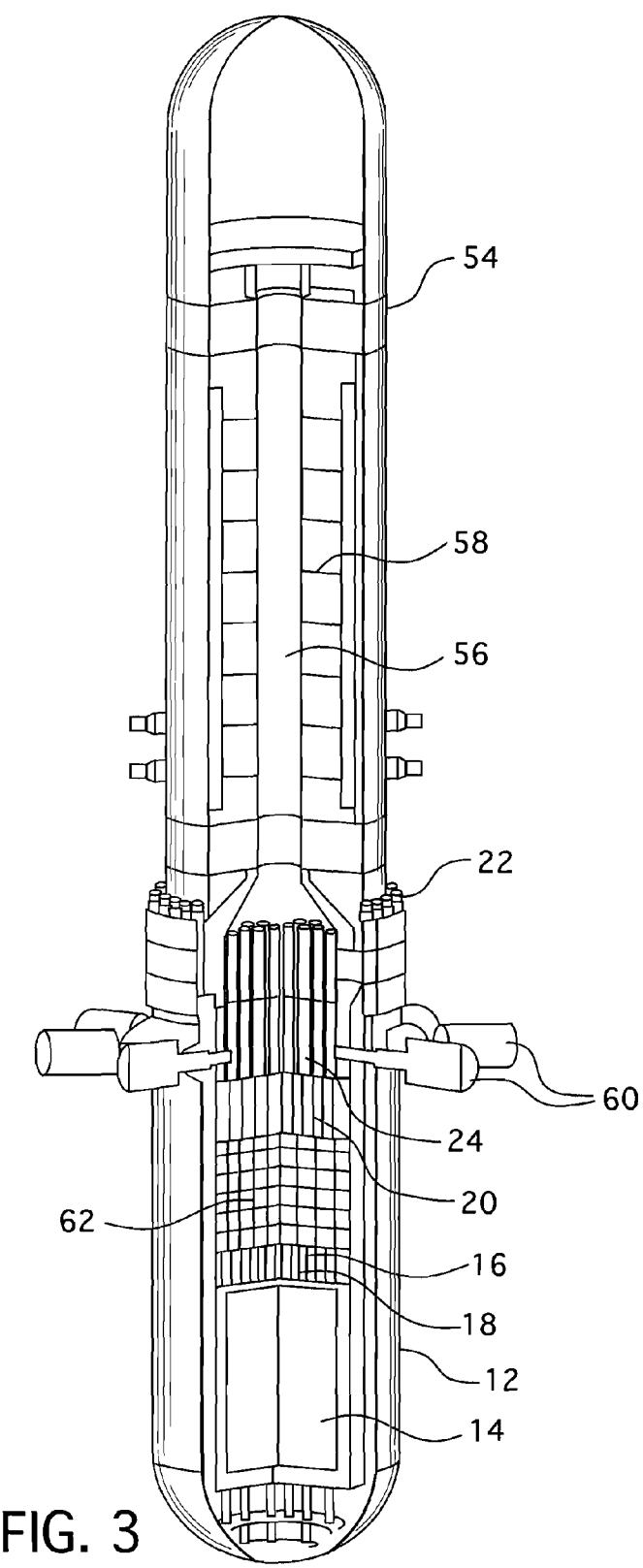
FIG. 3 is an enlarged view of the reactor shown in FIG. 2.

As also previously explained, the electrical coils used to activate the grippers 42 and 44 would not likely function reliably in an environment such as the modular reactors illustrated in FIGS. 2 and 3. However, the moving parts of the jack mechanism, i.e., the gripper and plunger assemblies have proven to be reliable over many years of service and the licensing of these new small modular reactors would benefit if the function and construction of the conventional gripper and plunger assemblies could be retained.

Figure 5:
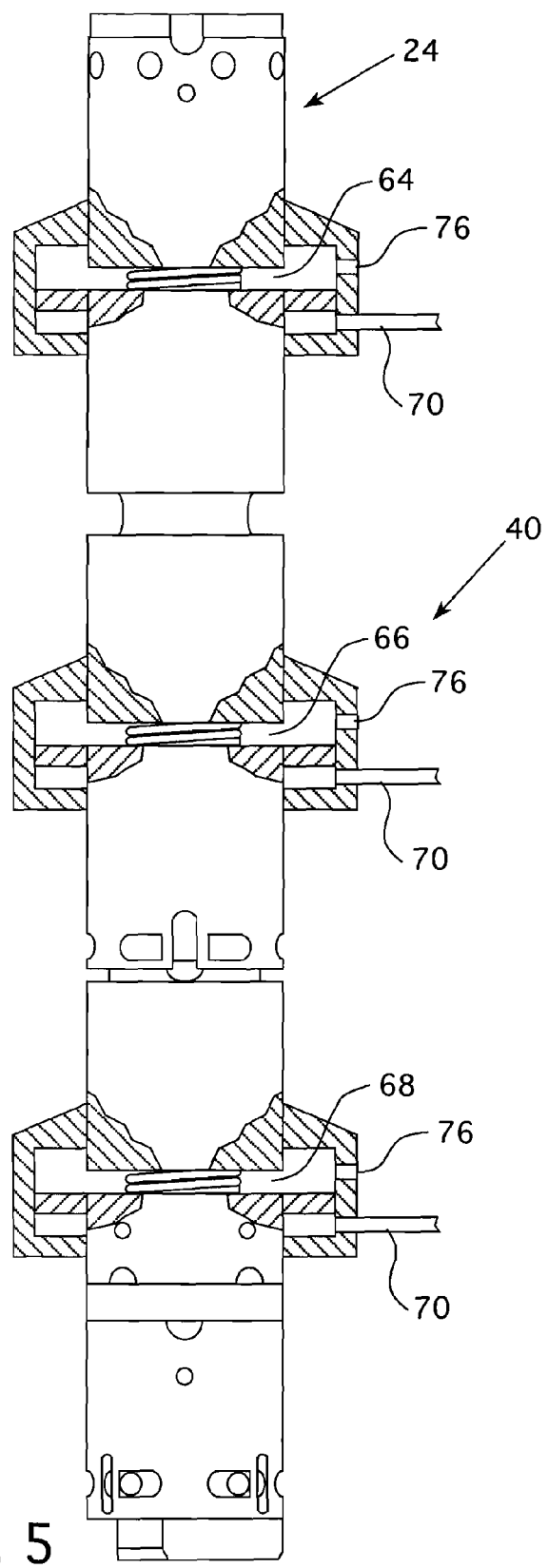
FIG. 5 is a schematic representation of a control rod drive rod drive system illustrating the location of the bellows sealed piston driven poppet valves employed to actuate the grippers in accordance with the embodiments described hereafter.
Figure 6:
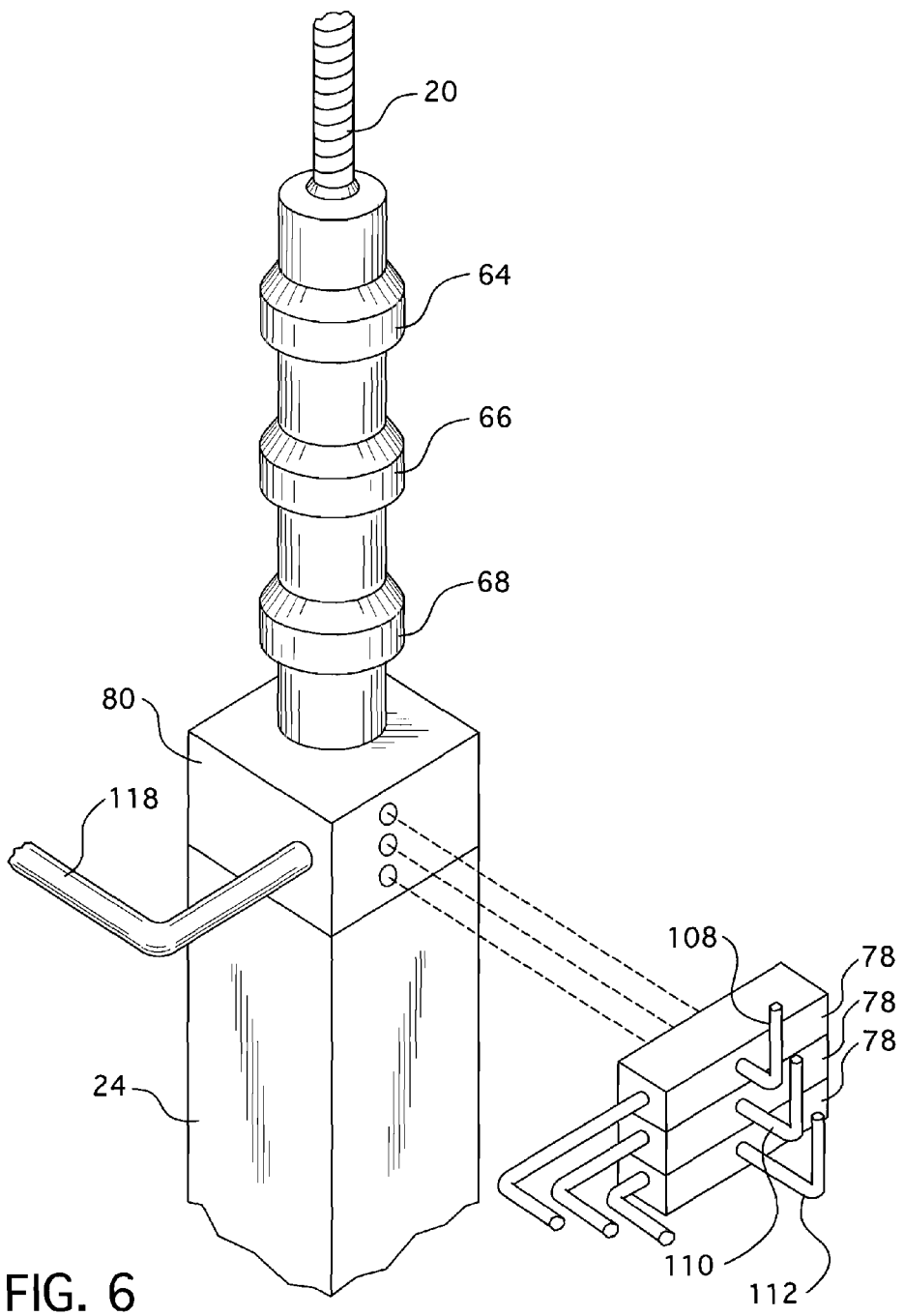
FIG. 6 is a schematic illustration of the upper portion of a guide tube with the hydraulic drive mounted on the upper portion thereof showing the valves and cylinders employed to activate the moveable gripper and stationary gripper to achieve incremental step movement of a control rod drive rod.
Figure 8:
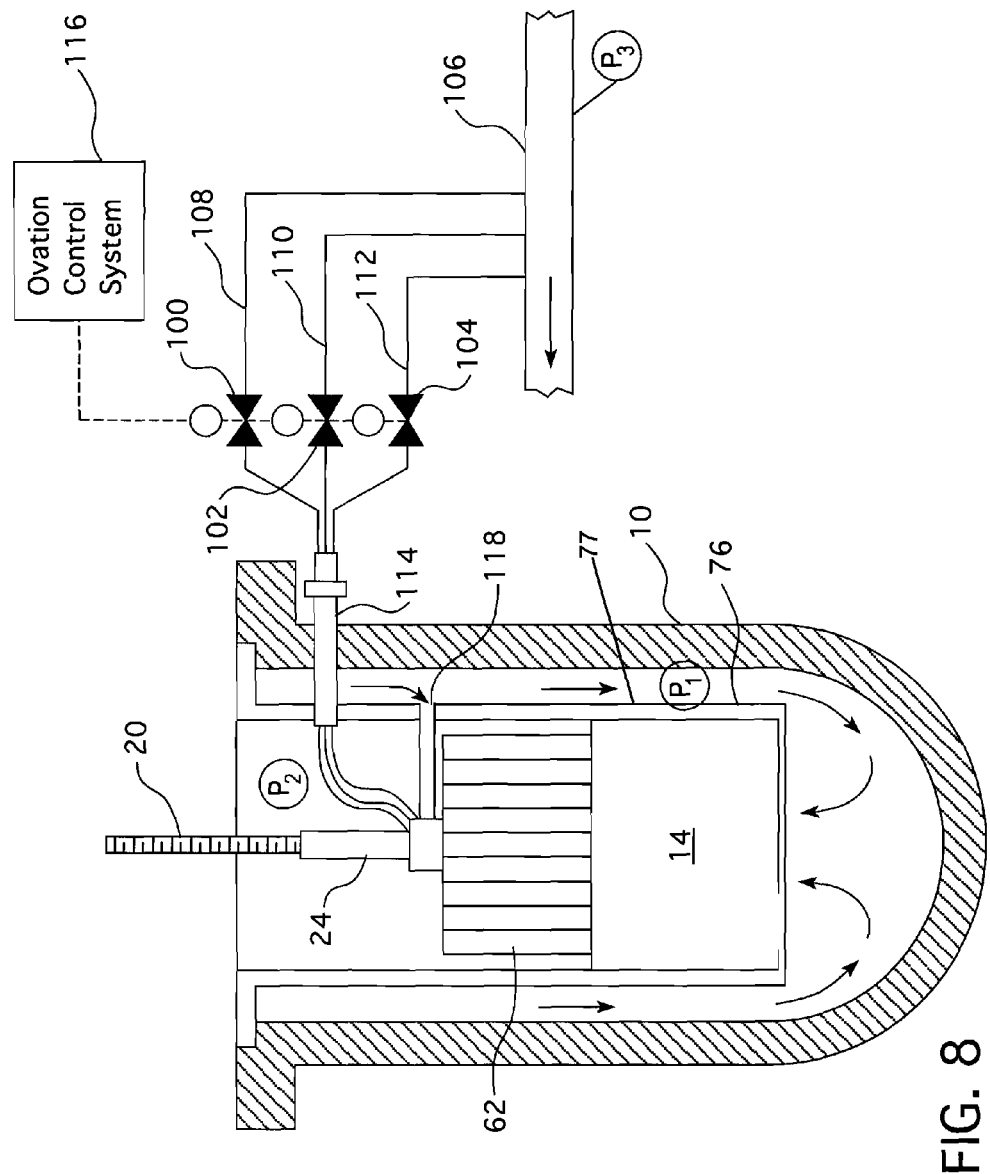
FIG. 8 is a schematic sectional view of a reactor vessel showing the core and upper internals and the external connections employed to drive the control rod drive rod.

FIG. 5 provides a schematic view of the control rod drive housing 24 in the area of the control rod drive mechanism 40 modified in accordance with one embodiment of the inventions claimed hereafter. The electromagnetic coils of conventional drive mechanisms are replaced by three bellows sealed hydraulic pistons; a lift piston 64, a moveable gripper piston 66 and a stationary gripper piston 68. The lift piston 64 is mechanically coupled to the lift plunger 52 which will move the moveable gripper upward when activated. Similarly, the moveable gripper piston 66 is attached to the moveable gripper 42 and will cause the moveable gripper to engage an adjacent groove in the drive shaft when activated. In a like manner, the stationary gripper piston 68 is mechanically connected to the stationary gripper 44 and will cause the stationary gripper to engage an adjacent groove in the drive shaft when activated. Each of the bellows sealed pistons 64, 66 and 68 has a reactor coolant inlet 70 that activates the piston and vents into the surrounding reactor coolant passing through the upper internals, through the vent outlets 76. The force on the bellows sealed pistons 64, 66 and 68 is derived from the pressure differential between the coolant flowing in the annulus between the core barrel 77 and the reactor vessel 10, shown in FIG. 8, and the coolant exiting the core 14 through the upper internals 62. Three pilot valves 78, shown in FIG. 6, respectively activate, upon command from a reactor control system, the bellows sealed pistons 64, 66 and 68 are mounted respectively at each latch assembly and the valves for driving the bellows sealed pistons are mounted on the outside of the latch assembly mounting block 80 which forms a manifold for the coolant entering through conduit 82 from the cold side of the core barrel 77. The latch assembly mounting block is mounted to an upper portion of the guide tube through which the control rod drive shaft travels.

Figure 7:
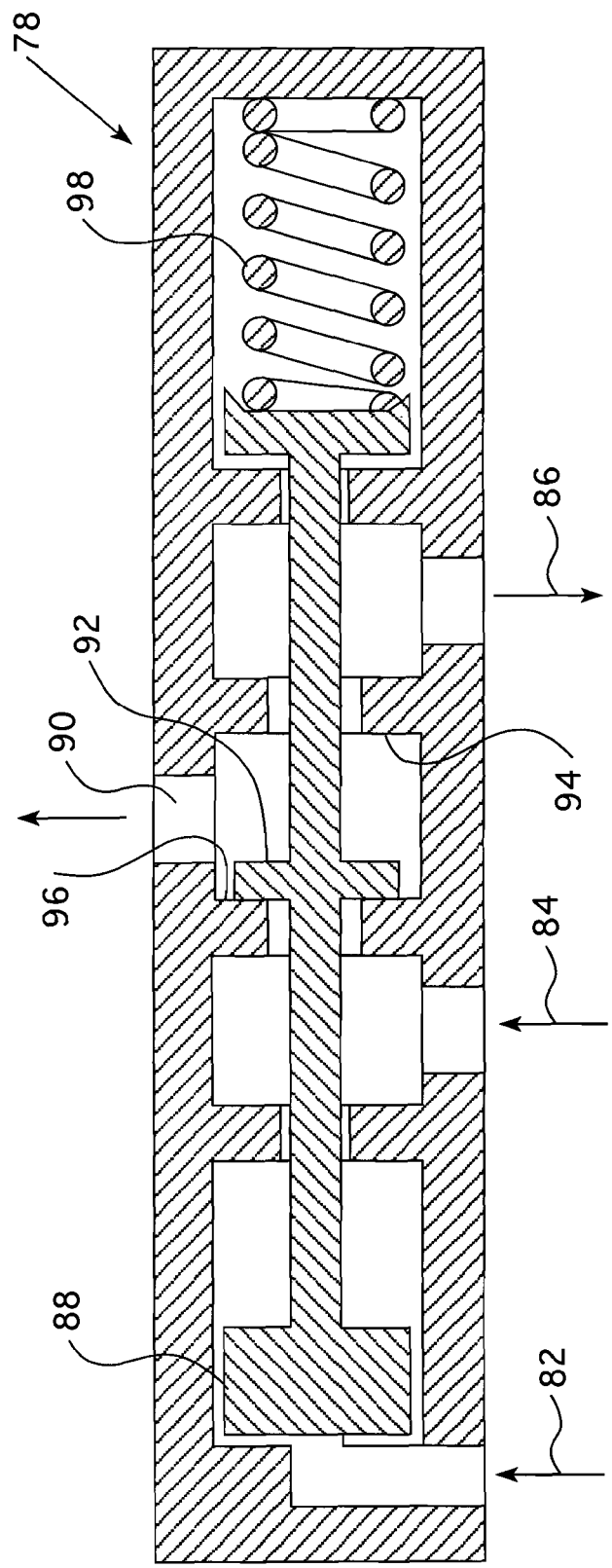
FIG. 7 is a sectional view of a poppet piston valve used to control hydraulic fluid to the bellows sealed valves that drive the moving components of the control rod drive rod drive system.

FIG. 7 is a cross section of one of the pilot valves 78. The pilot valves 78 receive an input 82 from the reactor charging pump, which is otherwise employed to add coolant to the core. The input 82 applies a force of approximately 100 psi against a ground pilot ceramic coated piston 88 which moves the piston in the direction of the return spring 98 and unseats the poppet 92 from the seat 96 enabling the inlet 84 to open. In the open condition inlet 84 passes high pressure reactor coolant sourced from the outside of the core barrel, through to the outlet 90 which is connected to the corresponding latch assembly pistons 64, 66 and 68. In the open position, the poppet 92 seals against the seat 94 so that the high pressure coolant entering through inlet 84 does not leak through the piston vent path 86. When the input from the charging pump is removed from the inlet 82 the return spring 98 seats the piston 88 against the opposite end of the cylinder closing off the inlet 82 and the seat 96. In the closed position, the latch piston assembly can vent its driving fluid to the surrounding coolant through the outlet 86. Activation of the pilot valves 78 is controlled by a control system 116, shown in FIG. 8, which controls the timing of the opening of the pilot valves 78 by controlling when the output of the charging pump 106 is conveyed to each pilot valve by way of the pilot solenoid valves 100, 102 and 104, which respectively control the flow of coolant to the input 82 of the pilot valves for the lift cylinder 64, moveable gripper cylinder 66 and stationary cylinder 68. The feed tubes from the charging pump are conveyed through the wall of the reactor vessel 10 through a quicklok style closure 114 and are connected to the respective inputs 82 on the corresponding pilot valves 78. As previously mentioned, the feed for activating the piston/cylinder combinations associated with the lift plunger 64 and moveable gripper 66 and stationary gripper 68 is obtained from the cold side of the core barrel through a conduit 118. Thus, this arrangement is effective to operate the gripper/plunger assembly that already has proven reliability. If there is a loss of feed from the charging pump, the control rods will fail in a safe condition and drop into the core.

Figure 9:
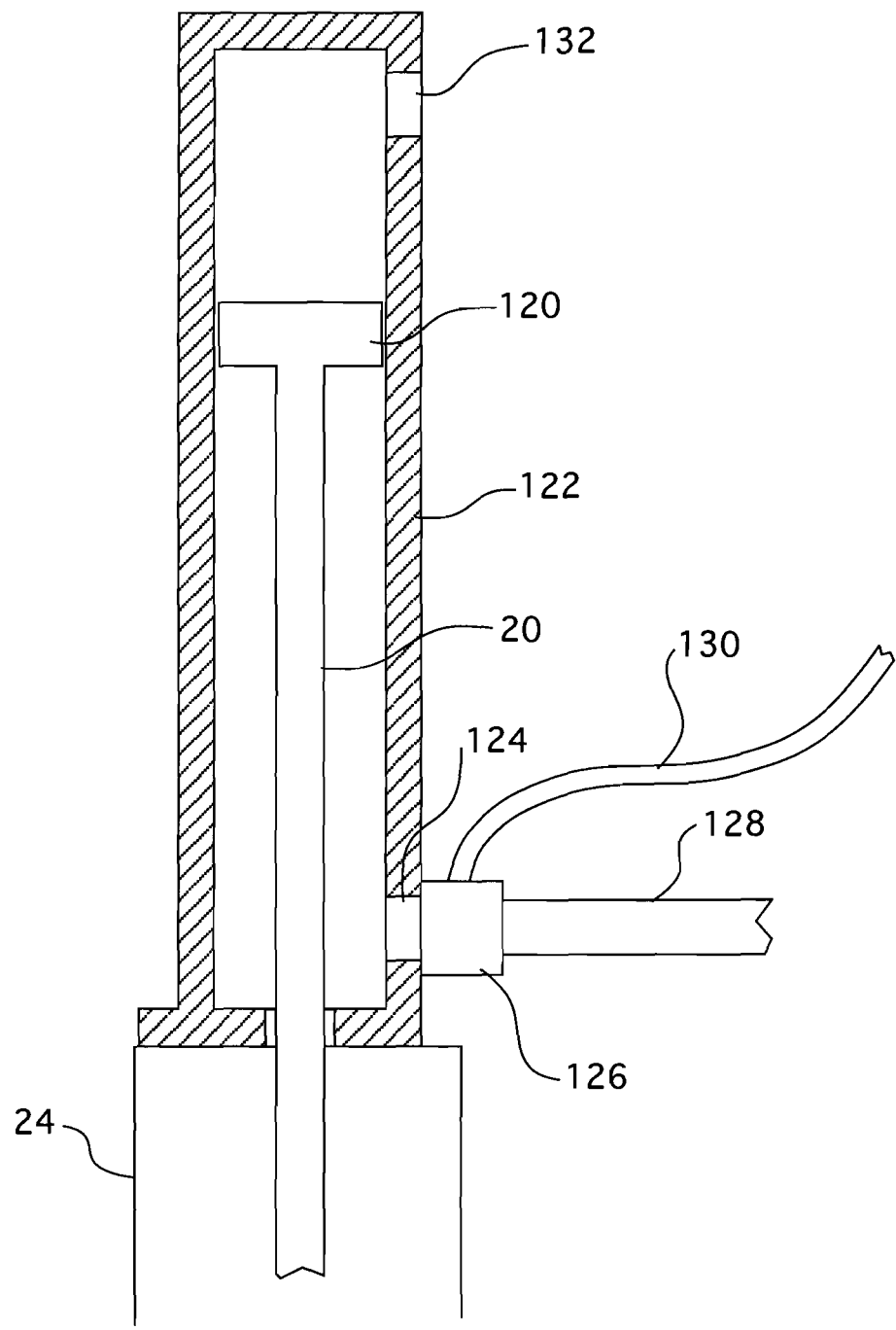
FIG. 9 is a schematic representation of the upper section of a guide tube for guiding a shutdown rod with another embodiment of this invention supported on an upper portion of the guide tube for hydraulically driving the shutdown rod between one of two positions; all in or all out.

FIG. 9 illustrates an alternate hydraulic drive arrangement for the shutdown rods that operate either fully within the core or completely out of the core. In this embodiment, the upper portion of the drive rod 20 for the shutdown control rods is formed as a piston 120. The piston 120 receives an input from the cold side of the core barrel through a conduit 128 and inlet 124, which is controlled by a Poppet valve 126. Poppet valve 126 receives the charging pump feed through conduit 130, which is in turn controlled by the reactor control system through an external solenoid valve as previously described. When activated by the solenoid valve pressure is applied from the charging pump through the conduit 130, which raises drive rod 20 to the top of the cylinder 122 and exhausts coolant from the upper portion of the cylinder through the vent 132. When the external solenoid cuts off the charging pump input through the conduit 130, the pressure conveyed by the coolant flowing through conduit 128 from the cold side of the core barrel is removed and the shutdown rod drops into the core with the coolant below the piston 120 venting through the Poppet valve 126. A single external solenoid and single Poppet valve can be used for each of the shutdown rods since they act in unison.

Thus, the control drive system claimed hereafter provides no dilution of reactor coolant from external sources and seals are not required for the water driven pistons since leakage would only result in coolant leaking into the coolant. Furthermore, loss of reactor coolant pumps will directly cause all rods to drop which is the action desired under such a condition. Additionally, the lift stroke for the incremental movement of a control rods can be greater than the current ⅝ inch (1.63 cm) conventionally obtained, since the lifting force is not dependent upon magnetic flux and sufficient force is applied to enable strokes between one inch (2.54 cm) and two inches (5.08 cm). Furthermore, lift capacity is not dependent upon the magnetic flux limitation which is approximately 360 pounds (163.29 Kg) and lift capacities of substantially up to 1,000 pounds (453.59 Kg) are achievable.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear reactor power generating system having a nuclear reactor comprising:
   a reactor vessel including a lower section and a removable upper head having a horizontal span closing off the lower section and forming a pressure vessel;
   a reactor core housed in the lower section and comprising a plurality of fuel assemblies; and
   a control rod assembly including at least one control rod that is driven into or out of a corresponding one of the plurality of fuel assemblies, a drive rod connected to the control rod for driving the control rod into and out of the corresponding fuel assembly and a drive mechanism for activating the drive rod to move along a linear path as it drives the control rod into and out of the corresponding fuel assembly, wherein the drive mechanism comprises at least one hydraulic piston that imparts movement in up plurality of discrete increments to the control rod as the control rod is driven out of the core under a hydraulic power of the hydraulic piston, with the discrete increments occurring in steps that are intermediate to a fully in or fully out respective control rod position and a hydraulic fluid for driving the hydraulic piston is obtained entirely from a reactor coolant from within the reactor vessel and the differential pressure that drives the hydraulic piston of the drive mechanism is taken from the pressure differential across the core at two spaced locations within the reactor vessel.

2. The nuclear reactor power generating system of claim 1 wherein, except for a control system that activates a valve that controls a hydraulic fluid that drives the hydraulic piston, the drive mechanism is wholly contained within the reactor vessel.

3. The nuclear reactor power generating system of claim 1 wherein the pressure differential is taken on either side of a core barrel which surrounds the core, between the core and the reactor vessel.

4. The nuclear reactor power generating system of claim 1 wherein the drive mechanism includes a hydraulic control valve that controls the hydraulic fluid for driving the hydraulic piston, wherein the hydraulic control valve includes an input directly from a main charging pump that pumps a coolant into the reactor vessel.

5. The nuclear reactor power generating system of claim 4 wherein the control rod is a shutdown rod.

6. The nuclear reactor power generating system of claim 1 wherein the drive mechanism moves the control rod in discrete increments into and out of the core, wherein the discrete increments are greater than 5/8 inch (1.63 cm) and less than or equal to two inches (5.08 cm).

7. The nuclear reactor power generating system of claim 1 wherein the discrete increments are greater than 5/8 (1.63 cm) inch and less than or equal to one inch (2.54 cm).

8. The nuclear reactor power generating system of claim 1 wherein the hydraulic piston has a vent in an upper portion of a cylinder that surrounds the piston, that is vented directly (i.e., without leaving the reactor vessel) into a coolant flowing within the reactor vessel, as the piston rises within the cylinder to withdraw the control rod from the reactor core.

9. The nuclear reactor power generating system of claim 1 wherein the drive mechanism has a lift capacity of greater than 360 lbs. (163.29 kg.) and less than or equal to 1000 lbs. (453.59 kg.).

10. The nuclear reactor power generating system of claim 1 wherein the drive mechanism is substantially contained within an upper internals of the reactor vessel.

11. A nuclear reactor power generating system having a nuclear reactor comprising:

a reactor vessel including a lower section and a removable upper head having a horizontal span closing off the lower section and forming a pressure vessel;

a reactor core housed in the lower section and comprising a plurality of fuel assemblies; and a control rod assembly including at least one control rod that is driven into or out of a corresponding one of the plurality of fuel assemblies, a drive rod connected to the control rod for driving the control rod into and out of the corresponding fuel assembly and a drive mechanism the activating the drive rod to move along a linear path as it drives the control rod into and out of the corresponding fuel assembly, wherein the drive mechanism comprises:

at least one hydraulic piston that imparts movement in a plurality of discrete increments to the control rod as the control rod is driven out of the core wider a hydraulic power of the hydraulic piston; and a plurality of moveable components of a contemporary jack assembly of a magnetic jack drive mechanism having a stationary gripper coil, a moveable gripper coil and a lift coil, each magnetically coupled to a respective plunger which moves one of either a stationary gripper or moveable gripper and wherein the stationary gripper coil is replaced by a first hydraulic piston which is mechanically coupled to the stationary gripper, the moveable gripper coil is replaced by a second hydraulic piston which is mechanically coupled to the moveable gripper and the lift coil is replaced with a third hydraulic piston which is mechanically coupled to the moveable gripper, with the first, second and third hydraulic pistons controlled to actuate the corresponding gripper that they are coupled with to sequentially move the grippers in a traditional manner.

12. The nuclear reactor power generating system of claim 11 wherein the first, second and third hydraulic pistons are substantially of the same design.

13. The nuclear reactor power generating system of claim 12 wherein the first, second and third hydraulic pistons are controlled by Poppet pistons.

* * * * *